(12) United States Patent
Ducardonnet et al.

(10) Patent No.: US 11,155,229 B2
(45) Date of Patent: Oct. 26, 2021

(54) DEVICE FOR REMOVABLY MOUNTING AN AIRBAG MODULE

(71) Applicant: AUTOLIV DEVELOPMENT AB, Vargarda (SE)

(72) Inventors: Antoine Ducardonnet, Pressagny l'Orgueilleux (FR); Fabrice Moinard, Vouzailles (FR); Frederic Tarte, Biard (FR); Rene Fliegner, Inning am Holz (DE)

(73) Assignee: Autoliv Development AB, Vargarda (SE)

( * ) Notice: Subject to any disclaimer, the term of this patent is extended or adjusted under 35 U.S.C. 154(b) by 176 days.

(21) Appl. No.: 16/454,761

(22) Filed: Jun. 27, 2019

(65) Prior Publication Data
US 2020/0001816 A1    Jan. 2, 2020

(30) Foreign Application Priority Data
Jun. 29, 2018  (FR) ...................................... 1855985

(51) Int. Cl.
*B60R 21/203*      (2006.01)
(52) U.S. Cl.
CPC ................. *B60R 21/2035* (2013.01)
(58) Field of Classification Search
CPC ............................ B60R 21/2037; B60Q 5/003
See application file for complete search history.

(56) References Cited

U.S. PATENT DOCUMENTS

| 5,738,369 | A  | * | 4/1998  | Durrani ................. | B60Q 5/003 280/728.2 |
| 6,402,193 | B1 | * | 6/2002  | Fleckenstein ......... | B60Q 5/003 200/61.55 |
| 6,554,312 | B2 | * | 4/2003  | Sakane ................. | B60Q 5/003 280/728.2 |
| 6,675,675 | B1 | * | 1/2004  | Sauer .................. | B60R 21/2037 280/731 |
| 6,688,638 | B2 | * | 2/2004  | Schutz .................. | B60Q 5/003 200/61.55 |
| 6,830,263 | B2 | * | 12/2004 | Xu ...................... | B60R 21/2037 280/728.2 |

(Continued)

FOREIGN PATENT DOCUMENTS

DE    102013008819 A1 * 11/2014 ......... B60R 21/2037
DE    112006004085 B4 *  7/2020 ......... B60R 21/2037

(Continued)

*Primary Examiner* — Nicole T Verley
(74) *Attorney, Agent, or Firm* — Harness, Dickey & Pierce, P.L.C.; Stephen T. Olson

(57) ABSTRACT

A device for removably mounting an airbag module includes at least two hooks connected to one of the airbag module or the steering wheel. The hooks cooperate with insertion elements located on the other of the airbag module or the steering wheel. A resilient ring forms elements for holding the hooks in zones of interaction. The resilient ring includes:
first portions that extend in the interaction zones, and
a second portion. The mounting device further includes elements for guiding the resilient ring that cause displacement of the first portions out of the zones of interaction, during displacement of the second portion in a direction away from an axis of rotation of the steering wheel.

16 Claims, 3 Drawing Sheets

(56) References Cited

U.S. PATENT DOCUMENTS

| | | | | |
|---|---|---|---|---|
| 7,097,197 B2* | 8/2006 | Keutz | B60R 21/2037 | 280/728.2 |
| 7,159,897 B2* | 1/2007 | Worrell | B60Q 5/003 | 200/61.55 |
| 7,380,817 B2* | 6/2008 | Poli | B60R 21/2037 | 200/61.54 |
| 7,478,830 B2* | 1/2009 | Weigand | B60Q 5/003 | 200/61.54 |
| 7,490,852 B2* | 2/2009 | Marotzke | B60Q 5/003 | 280/731 |
| 7,621,560 B2* | 11/2009 | Spencer | B60R 21/2037 | 200/61.54 |
| 7,789,415 B2* | 9/2010 | Groleau | B60R 21/2037 | 280/728.2 |
| 8,087,691 B2* | 1/2012 | Nebel | B60R 21/2037 | 280/731 |
| 8,336,911 B2* | 12/2012 | Hondier | B60R 21/2037 | 280/731 |
| 8,419,052 B2* | 4/2013 | Yamaji | B60R 21/2037 | 280/731 |
| 8,448,982 B2* | 5/2013 | Yamaji | B60R 21/2037 | 280/731 |
| 8,474,867 B2* | 7/2013 | Nebel | B60R 21/2037 | 280/731 |
| 8,511,707 B2* | 8/2013 | Amamori | B60R 21/2035 | 280/728.2 |
| 8,616,577 B1* | 12/2013 | Matsu | B60R 21/2037 | 280/728.2 |
| 9,027,960 B1* | 5/2015 | Yoshida | B60R 21/203 | 280/731 |
| 9,592,783 B2* | 3/2017 | Nebel | B60R 21/217 |  |
| 9,725,063 B2* | 8/2017 | Collazo | B60R 21/2037 |  |
| 10,391,934 B2* | 8/2019 | Leforestier | H03K 17/9625 |  |
| 2003/0173759 A1* | 9/2003 | Grenier | B60R 21/2035 | 280/728.2 |
| 2012/0279835 A1* | 11/2012 | Shellabarger | H01H 3/142 | 200/61.55 |
| 2020/0189657 A1* | 6/2020 | Gothekar | B60Q 5/003 |  |

FOREIGN PATENT DOCUMENTS

| | | | | |
|---|---|---|---|---|
| FR | 2693870 A1 * | 1/1994 | | H01H 11/0056 |
| GB | 2309123 A * | 7/1997 | | B60Q 5/003 |
| GB | 2398277 A * | 8/2004 | | B60R 21/21658 |
| JP | 6180836 B2 * | 8/2017 | | |
| WO | WO-2019183167 A1 * | 9/2019 | | B60R 21/2037 |
| WO | WO-2020053248 A1 * | 3/2020 | | B60Q 5/003 |

* cited by examiner

DEVICE FOR REMOVABLY MOUNTING AN AIRBAG MODULE

CROSS-REFERENCE TO RELATED APPLICATION

This application claims priority to French Patent Application No. 1855985 filed 29 Jun. 2018 which is hereby expressly incorporated by reference herein in its entirety.

FIELD

The present invention relates, in a general manner, to a device for removably mounting an airbag module on a steering wheel.

BACKGROUND

US2003173759 describes an arrangement for mounting an airbag module on a steering wheel so as to be removable. The arrangement comprises a mounting plate which defines openings for receiving the feet of an airbag unit. The plate is equipped with a spring which extends through the openings in order to provide fixing by means of snap-locking. When a thrust force is exerted on a specified point of the spring, said spring is displaced in a predetermined manner and the portions of the spring are guided such that they no longer pass beyond the corresponding openings, thus making it possible to free the module. The thrust force for releasing the spring is applied on a small region of the spring, which can result in improper manipulation during the release operation.

SUMMARY

An object of the present invention is that of overcoming the drawbacks of the prior art document mentioned above, and in particular of proposing a device for removable mounting in which the force required for releasing the airbag module is reduced and the dismantling of which is facilitated, while preserving the module retaining forces.

In order to achieve this, a first aspect of the invention relates to a device for removably mounting an airbag module on a steering wheel, the mounting device comprising at least two hooks that are connected to one of the airbag module or the steering wheel, the hooks cooperating with insertion elements located on the other of the airbag module or the steering wheel, and a resilient ring for forming elements for holding the hooks on the other of the airbag module or the steering wheel, in zones of interaction with the hooks, the resilient ring being held in position by first blocking elements, according to the axis of the steering wheel, on the other of the airbag module or the steering wheel, which blocking elements are arranged close to the insertion elements, the resilient ring comprising:
first portions that extend in the interaction zones in order to form the elements for holding the hooks
a second portion that is located between the first portions of the resilient ring, the mounting device further comprising elements for guiding the resilient ring that cause displacement of the first portions of the resilient ring out of the zones of interaction with the hooks in order to free the hooks from the other of the airbag module or the steering wheel, during displacement of the second portion in a direction away from the axis of rotation of the steering wheel, and characterized in that the resilient ring is held in position by second blocking elements, according to the axis of the steering wheel, on the other of the airbag module or the steering wheel, which blocking elements are arranged between the first blocking elements.

It is thus clear that the dismantling is achieved by pulling on the ring rather than pushing thereon. This makes it possible to design a system that requires a smaller dismantling force, since there are fewer restrictions in the length of displacement of the second portion of the resilient ring that is required for dismantling. Indeed, when the airbag module is mounted on the steering wheel, there are generally fewer parts close to the second part of the ring when it moves away from the axis of rotation of the steering wheel. As a result, smaller lever arms may be defined, in order to reduce the forces for deforming the ring, and thus for dismantling. As a result, the device allows for the dismantling to be achieved by means of a displacement of the second portion of between 5 and 10 mm. A displacement in this range thus allows for dismantling at a force of less than 100 N. It is also clear that the axis of rotation of the steering wheel is the axis about which the steering wheel can rotate in order to direct a vehicle on which it is mounted.

The insertion elements may be in the form of one or more holes, openings, grooves, or recesses for example. The guide elements may be in the form of one or more pins, grooves, or ribs for example.

The second blocking elements may in particular prevent unintentional disengagement of the ring from the operating position thereof, if improper manipulation is carried out using a tool during the dismantling operation.

According to another variant, the hooks are connected to the airbag module, the mounting device further comprising a mounting plate that is designed so as to be mounted on the framework of the steering wheel, the mounting plate comprising a plurality of openings that form the insertion elements, each opening being suitable for receiving a hook, the first and second blocking elements of the resilient ring being formed on the mounting plate or the steering wheel.

The mounting plate in particular makes it possible to facilitate the assembly operations. Indeed, the resilient ring may be pre-assembled on the mounting plate before said plate is mounted on the steering wheel.

According to another variant, the guide elements comprise, close to the resilient ring, between the second portion and each first portion of the resilient ring,
a pivot stud that limits the movement of the resilient ring during the displacement of the second portion in order to bring about a rotation of the first portions out of the zone of interaction with the corresponding hook.

The pivot studs make it possible to convert the translational movements of the second portion into a rotational movement of the first portions.

According to another variant, the device comprises two pivot studs that are symmetrical with respect to a plane containing the axis of rotation of the steering wheel.

According to another variant, the guide elements comprise a guide stud for the resilient ring, close to the resilient ring, between the second portion and the pivot stud.

According to another variant, the resilient ring comprises three folds between the second portion and the pivot stud.

According to another variant, in the displacement direction of the second portion in a direction away from the axis of rotation of the steering wheel, the distance between the pivot studs and the second portion is between 30 and 70% of the distance between the second portion and the center of the interaction zone.

According to another variant, the device comprises two guide studs that are symmetrical with respect to a plane containing the axis of rotation of the steering wheel.

The resilient studs make it possible to correctly guide the displacement of the resilient ring, in the dismantling direction, i.e. in the direction away from the axis of rotation of the steering wheel. Said resilient studs thus make it possible to prevent complete rotation of the ring, in particular in a direction in parallel with the axis of rotation of the steering wheel, which is a rotation which may complicate disengagement of the ring simultaneously with the hooks.

According to another variant, the resilient ring is open, the first portions being located at the free ends of the resilient ring.

The tractive force is reduced by using an open ring.

According to another variant, the second portion of the resilient ring is positioned on the resilient ring so as to be at a substantially equal spacing from the first portions.

This particular arrangement allows for a symmetrical displacement of the first portions.

According to another variant, the blocking elements prevent the movement of the resilient ring in a direction perpendicular to the direction away from the axis of rotation of the steering wheel, and that is within a plane perpendicular to the axis of rotation of the steering wheel.

The blocking elements can also block a displacement in the direction away from the axis of rotation of the steering wheel that goes beyond a predetermined distance that is greater than the distance required for the dismantling process, in order to prevent dismantling of the ring.

According to another variant, the first and second blocking elements are formed by hooks.

According to another variant, the second blocking elements comprise are arranged in the region of the second portion.

Said hooks make it possible to limit the deformations of the joint when the airbag module is triggered.

According to another variant, the mounting device comprises two second hooks that are located between the two guide studs.

A second aspect of the invention relates to a tool for dismantling the device for mounting an airbag module according to the first aspect of the invention, and is characterized in that the dismantling tool comprises a prevention handle, mounted in the axis of which is:

an end of a rod, the free end of the rod comprising a notch, the inside dimensions of which substantially correspond to the outside dimensions of the cross section of the second portion of the resilient ring, such that the rod is oriented in the direction away from the axis of rotation of the steering wheel (2) when the notch is engaged on the second portion.

A third aspect of the invention relates to an assembly for a steering wheel, comprising the airbag module of the mounting device according to the first aspect of the invention, and a dismantling tool according to the second aspect of the invention.

BRIEF DESCRIPTION OF THE DRAWINGS

Further features and advantages of the present invention will become clearer from reading the following detailed description of an embodiment of the invention, which is given by way of non-limiting example and is illustrated in the accompanying drawings, in which.

DETAILED DESCRIPTION

Figure 1:
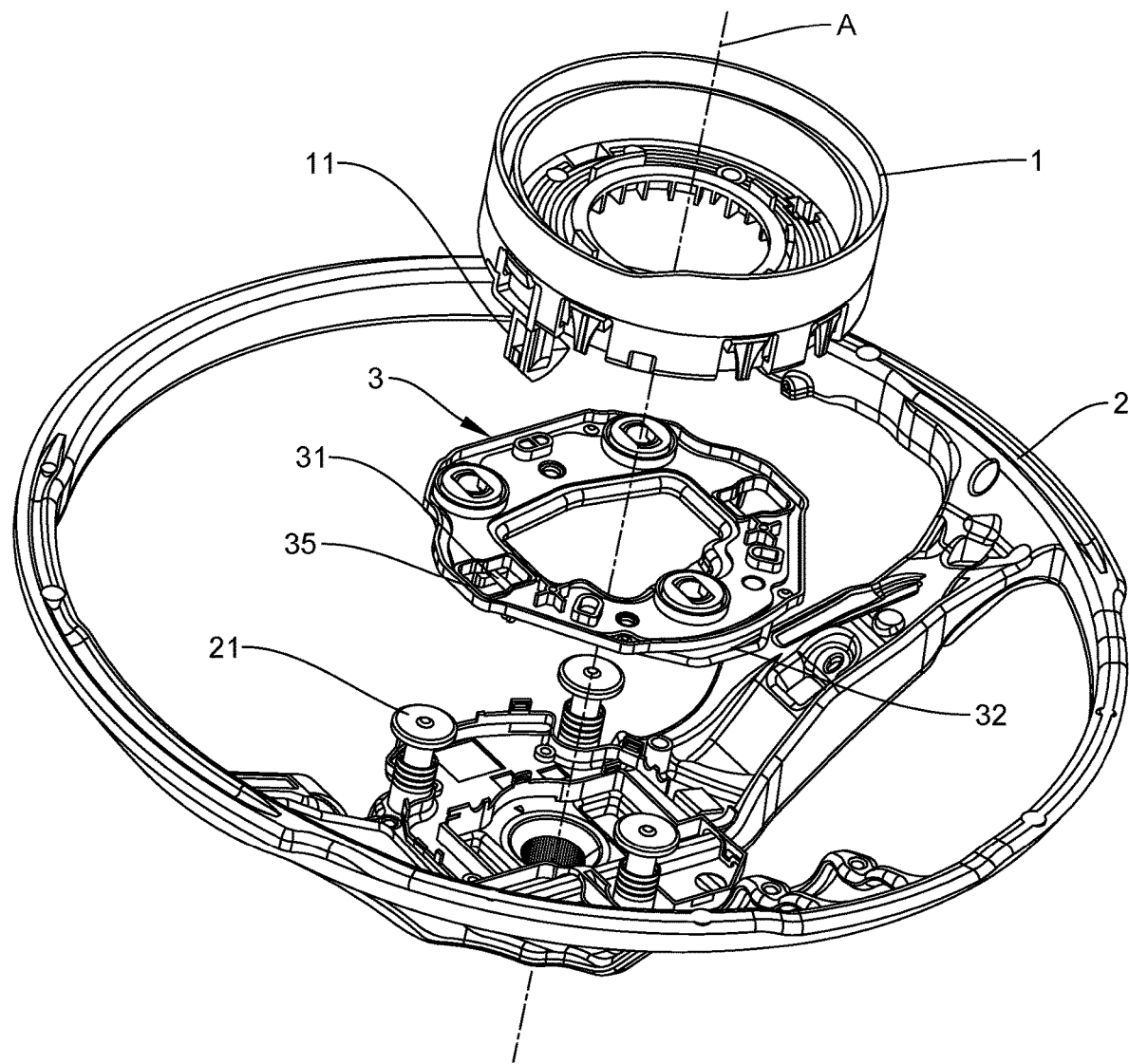
FIG. 1 is a first exploded view of a steering wheel fitted with the device for removably mounting an airbag module.

The device for removable mounting, according to the invention, will now be described with reference to FIG. 1 to 3.

In the following, the axis of rotation A of the steering wheel 2 denotes the axis about which the rotation of the steering wheel orients the wheels of the vehicle, owing to a mechanical, electrical, and/or hydraulic transmission mechanism (not shown).

In a manner known per se, a module 1 of an airbag 1 is mounted on the steering wheel 2 by means of a fixing plate 3 for example. The mounting plate 3 is fixed on the steering wheel 2 by means of screws 21. The airbag module 1 is mounted on the mounting plate 3 by means of snap-fitting. In order to achieve this, the mounting plate comprises a plurality of openings or apertures 35 through which hooks 11 of the airbag module 1 are inserted. The snap-fitting of the module 1 on the mounting plate 3 is achieved by means of a resilient ring 30 which interacts with the hooks 11 in an interaction zone in the region of the openings 35. According to the variant shown, the resilient ring 30 is mounted on the mounting plate 3, but variants are nonetheless conceivable in which the resilient ring 30 is mounted on or rigidly connected to the framework 2 of the steering wheel and/or the airbag module 1. Of course, if the resilient ring 30 is mounted on or rigidly connected to the airbag module 1, the hooks 11 are mounted on or rigidly connected to the steering wheel 2.

Figure 2:
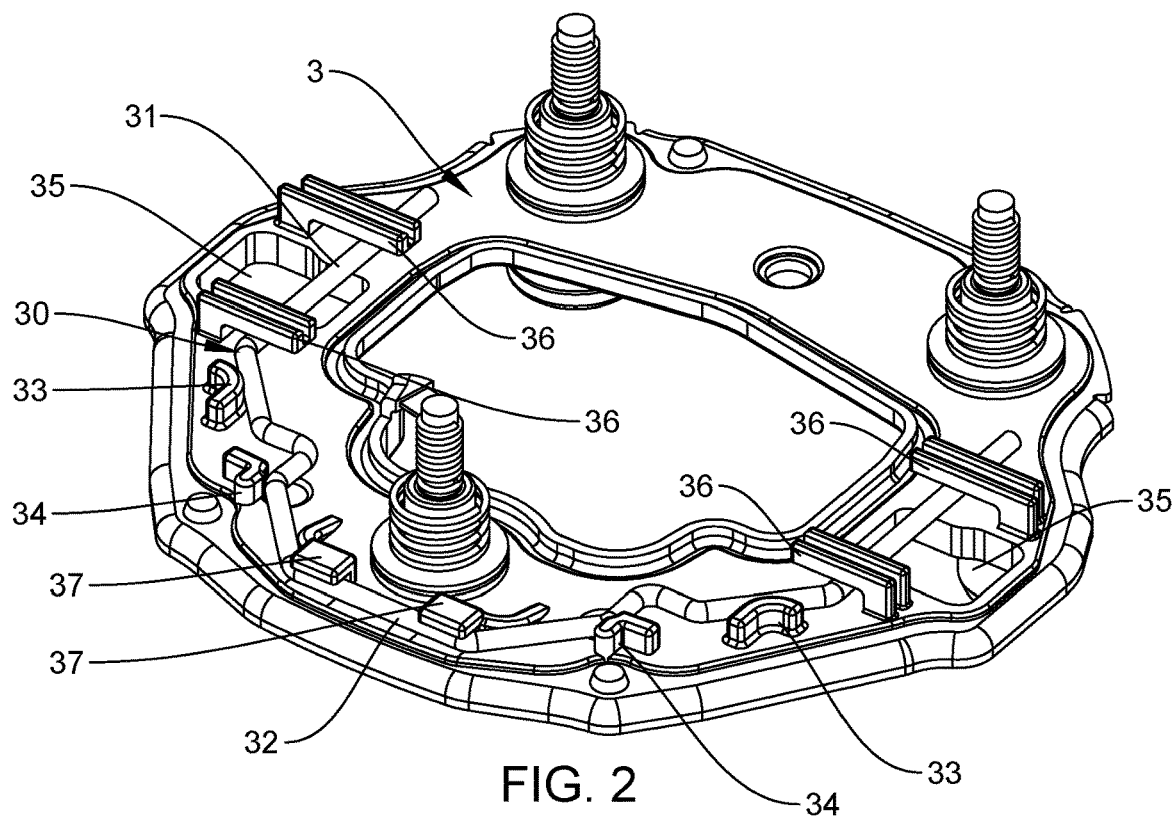
FIG. 2 is a view from below of the device for removably mounting an airbag module, in the locked position.

As shown in FIG. 2, the resilient ring 30 comprises first portions 31 which extend through the openings 35 of the mounting plate 3. When the airbag module 1 is mounted on the mounting plate 3, the first portions 31 of the resilient ring 30 are engaged in the hooks 11 of the airbag module 1, such that it is no longer possible to remove the hooks 11 without disengaging the first portions 31 of the resilient ring 30. This assembly ensures that the airbag module 1 is held on the steering wheel 2, inter alia when the airbag is deployed.

According to the invention, the resilient ring 30 comprises a second portion 32 that is located between the first portions 31 and the guide elements 33, 34 of the resilient ring 30. The guide elements 33, 34 are defined so as to bring about the displacement of the first portions 31 out of the zone of interaction with the hooks 11 when the second portion 32 is displaced in a direction away from the axis of rotation A of the steering wheel 2. In other words, when a user pulls the second portion 32 of the resilient ring 30 in a direction that is substantially normal to the axis of rotation A, the tractive force displaces the second portion 32 of the resilient ring 30 onto the mounting plate 3. This displacement is guided by the guide elements 33, 34 so as to bring about the displacement of the first portions 31 out of a zone of interaction with the hooks 11.

The guide elements 33, 34 comprise a pivot stud 33 for each first portion 31 of the resilient ring 30. Each pivot stud 33 is positioned so as to be in the immediate vicinity of, or preferably in contact with, the resilient ring 30, between the first 31 and the second portion 32 and so as to be eccentric with respect to the second portion 32. During the displacement of the second portion 32 in the direction of traction, the movement of the resilient ring 30 is restricted in the region of the pivot stud 33. The tractive force exerted on the second portion 32, associated with the resiliency of the ring 30, thus causes a displacement of each first portion 31 out of the zone of interaction with the hook 11. In the direction of traction (i.e. in a direction normal to the axis of rotation A), the distance D1 between the pivot studs 33 and the second portion 32 is between 30 and 70% of the distance D2 between the second portion and the center C of the interaction zone 35. This makes it possible to ensure an acceptable release force and to limit the risks of deformation of the ring in the zone extending from the second portion to the guide elements (33).

According to the variant shown, the resilient ring 30 is open, the first portions thus forming the free ends of the resilient ring 30. Using an open resilient ring 30 makes it possible to reduce the tractive force that is to be exerted on the second portion 32 in order to bring about the displacement of the first portions 31. According to this variant, the displacement of each first portion 31 is primarily a rotation, the axis of which is located close to the corresponding pivot stud 33.

In the same way, according to the variant shown, the resilient ring 30 comprises 3 folds 38 between the guide elements 33 and the second portion 32. "Fold" means the junction of two successive ring portions that form a non-zero angle therebetween. Said folds make it possible to rigidify the resilient ring 30 such that the maximum of the forces applied during dismantling are converted into a displacement of the first portions 31 of the resilient ring 30.

According to a variant, the pivot studs 33 are positioned so as to be symmetrical with respect to a plane containing the axis of rotation A of the steering wheel 2.

Figure 3:
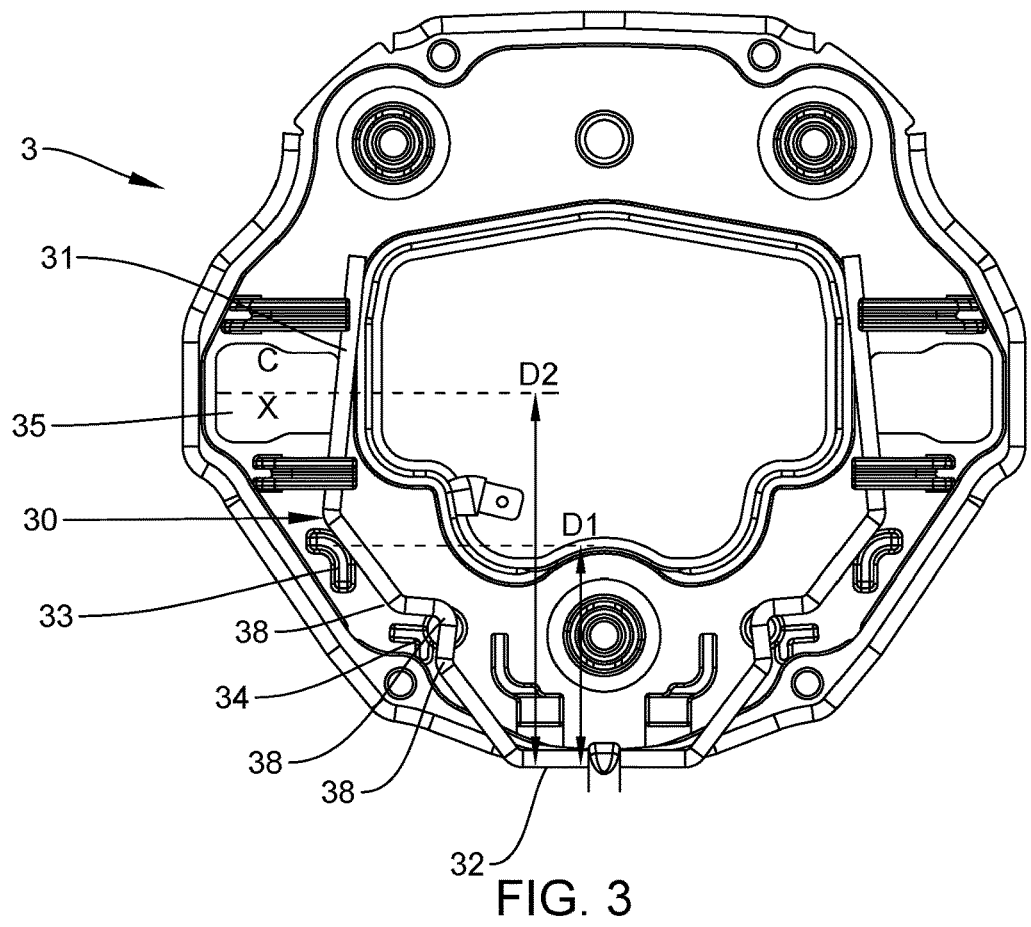
FIG. 3 is a view from below of the device for removably mounting an airbag module, in the release position.

FIG. 3 shows the position of the first portions 31 following traction of the second portion 32. In this position, the hooks 11 (not shown) are no longer engaged in the resilient ring 30, which makes it possible to remove the airbag module 1 from the steering wheel 2.

The guide elements 33, 34 may comprise a pivot stud 34 for each first end 31. According to an embodiment, each guide stud 34 is positioned between the second portion 32 and the pivot stud 33 of the corresponding first end 31. The guide studs 34 ensure the positioning of the resilient ring 30 on the plate during the application of the tractive force, in order to prevent the resilient ring from being removed from the mounting plate 3. Said guide studs also make it possible to prevent a rotation of the ring which could impede simultaneous disengagement of the hooks 11.

According to a variant, the guide studs 34 are positioned so as to be symmetrical with respect to a plane containing the axis of rotation A of the steering wheel 2.

According to the variant shown in the drawings, the pivot studs 33 and/or the guide studs 34 are formed on the mounting plate 3, but according to other variants the guide elements may be formed on the framework 2 of the steering wheel and/or on the airbag module 1.

According to anther variant, the guide elements may be in the form of one or more pins, grooves or ribs.

The resilient ring 30 and/or the first and second portions of the resilient ring 30 are held on the mounting plate 3 by means of blocking elements 36, 37. Said blocking elements 36, 37 ensure that the resilient ring is held in a plane that is substantially in parallel with the mounting plate 3, while leaving said ring free to move in this plane. The blocking elements 37 are provided in order to block the displacement of the resilient ring 30, primarily when the airbag module 1 is triggered.

According to the variant shown, the blocking elements 36, 37 may be in the form of a hook or may be L-shaped and originate from the mounting plate 3. First hooks 36 are arranged on either side of the openings 35. Said first hooks ensure correct positioning of the first portions 31 of the resilient ring 30 curing the operation for mounting the airbag module. Said first hooks 36 also ensure guidance of first portions 31 during the release process. Second hooks 37 are positioned in the region of the second portion 32 of the resilient ring 30. By way of example, the second hooks 37 are located between the guide studs 33, 34 and the second portion 32 of the resilient ring 30.

The second hooks 37 improve the holding of the resilient ring 30. This makes it possible, in particular, to improve the behavior of the resilient ring during engagement of the airbag, to prevent or to at least reduce all vibration noise. The second hooks 37 also make it possible to prevent disengagement of the resilient ring 30, for example by moving towards the axis of the steering wheel, if a dismantling tool is used to push on the ring. Disengagement of the resilient ring 30 would thus prevent any dismantling of an airbag module.

According to another variant, the blocking elements 36, 37 may originate from the framework 2 of the steering wheel and/or be on the airbag module 1.

A further aspect of the invention relates to a tool for dismantling the device for mounting an airbag module according to the invention. As explained above, release of the resilient ring 30 is achieved by exerting traction on the second portion 32 of the resilient ring 30. Thus, when the airbag module is mounted on the framework of the steering wheel, the resilient ring 30 is not accessible. The dismantling tool according to the invention may be inserted via a small opening made in the steering wheel, for example in the region of the mounting plate 3.

Figure 4:
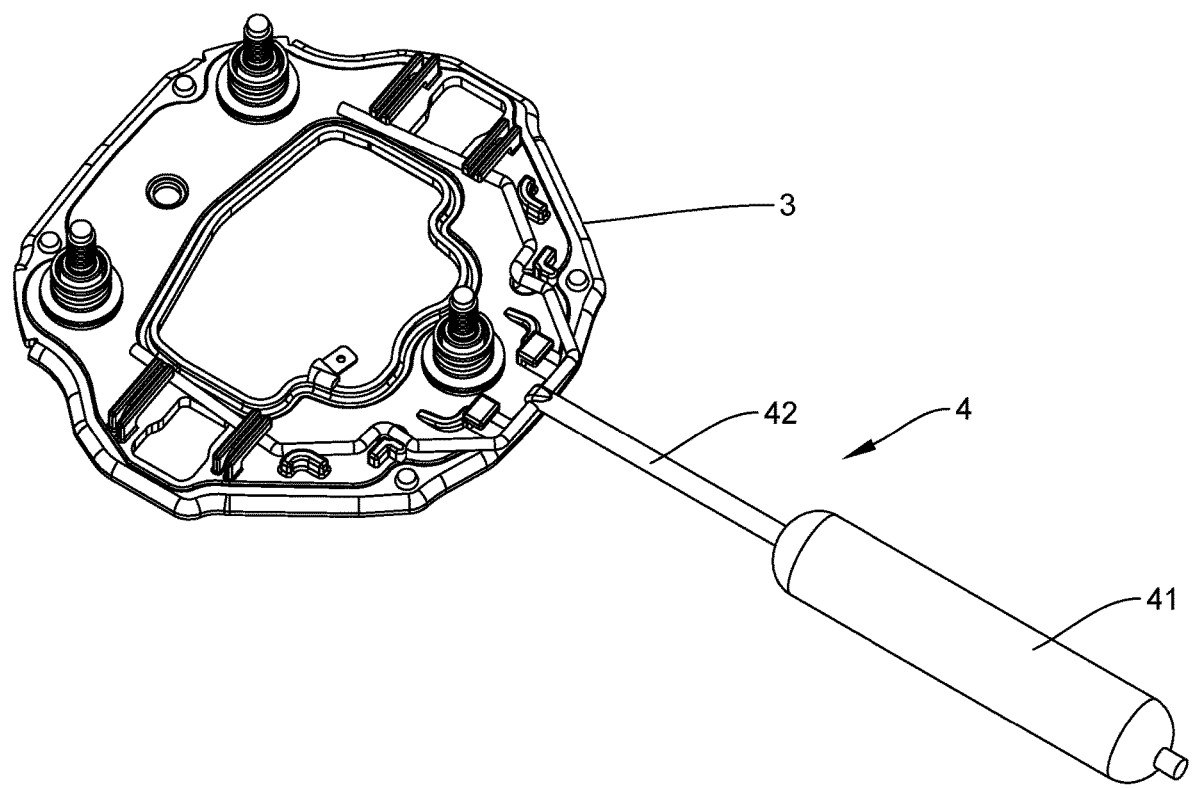
FIG. 4 is a view from below of a tool for dismantling the device for removably mounting an airbag module on a steering wheel according to the invention.
Figure 5:
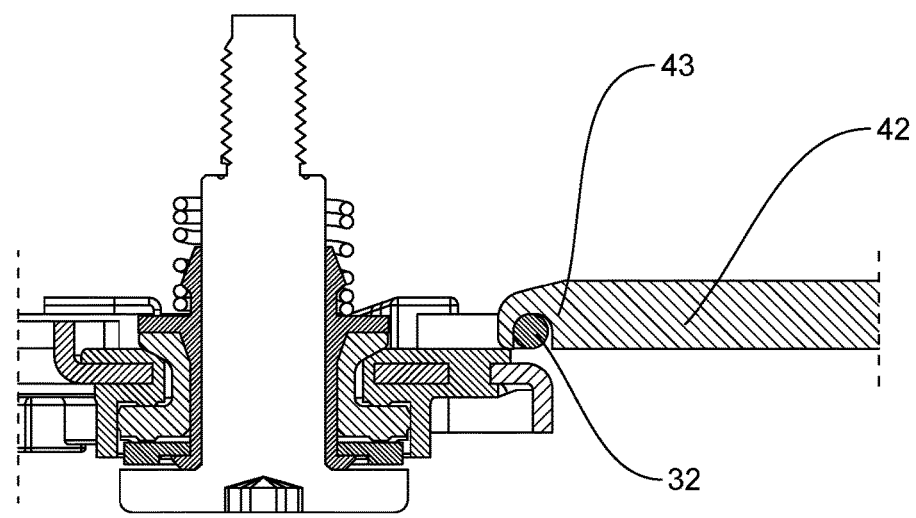
FIG. 5 is a detailed view of the dismantling tool.

With reference to FIGS. 4 and 5, the dismantling tool 4 comprises a gripping handle 41, one end of which is extended, in the direction of the longitudinal axis of the handle 41, by a rod 42. The free end of the rod 42, opposite the handle 41, comprises a notch 43. The shape of the notch 43 corresponds to the outside shape of the second portion 32 of the resilient ring 30, so as to be able to engage on the second portion 32. The orientation of the notch 43 is substantially perpendicular to the rod 42. Thus, when the end of the rod is engaged on the second portion 32 of the resilient ring 30, the dismantling tool 4 is substantially perpendicular to the second portion 32 of the resilient ring 30.

The operation for dismantling/replacing the airbag module takes place in the following manner: the user introduces the dismantling tool 4 via the opening in the steering wheel that is provided for this purpose, until the notch 42 of the rod 41 engages on the second portion 32 of the resilient ring 30. In order to facilitate this operation, gaps are provided on either side of the second portion (32), in the direction of traction.

The user thus exerts traction on the dismantling tool 4 until the first portions 31 of the resilient ring 30 are displaced out of the zone of interaction with the hook 11 of the airbag module 1. The airbag module can then be removed.

It will be understood that various modifications and/or improvements that are obvious to a person skilled in the art can be made to the various embodiments of the invention described in the present description, without departing from the scope of the invention as defined by the accompanying claims.

In particular, according to another variant (not shown), the mounting device does not comprise a mounting plate, and the airbag module comprises the hooks. According to this variant, the frame of the steering wheel comprises insertion elements for receiving the hooks of the airbag module. Said insertion elements may be in the form of openings, as on the mounting plate, or simple notches. The steering wheel also comprises blocking elements for the resilient ring, for example of the type of those of the variant of FIG. 1-3. As is the case for the variants described above, the resilient ring interacts with the hooks in order to hold the airbag module on the steering wheel.

According to another variant (not shown), the mounting device does not comprise a mounting plate, and the framework of the steering wheel comprises hooks. According to this variant, the airbag module comprises insertion elements for receiving the hooks of the steering wheel. Said insertion elements may be in the form of openings, as on the mounting plate, or simple notches, or of one or more holes, openings, grooves, or recesses. The airbag module also comprises blocking elements for the resilient ring. As is the case for the variants described above, the resilient ring interacts with the hooks in order to hold the airbag module on the steering wheel.

The invention claimed is:

1. A mounting device for removably mounting an airbag module on a steering wheel, the mounting device comprising:
at least two hooks connected to one of the airbag module or the steering wheel, the at least two hooks cooperating with insertion elements located on the other of the airbag module or the steering wheel;
a resilient ring for forming elements for holding the hooks on the other of the airbag module or the steering wheel, in zones of interaction with the hooks, the resilient ring held in position by first blocking elements, according to an axis of the steering wheel, on the other of the airbag module or the steering wheel, the first blocking elements arranged close to the insertion elements, the resilient ring including:
first portions extending in the interaction zones in order to form the elements for holding the hooks and a second portion located between the first portions of the resilient ring;
guide elements for guiding the resilient ring that cause displacement of the first portions of the resilient ring out of the zones of interaction with the hooks in order to free the hooks from the other of the airbag module or the steering wheel, during displacement of the second portion in a direction away from the axis of rotation of the steering wheel;
wherein the resilient ring is held in position by second blocking elements, according to the axis of the steering wheel, on the other of the airbag module or the steering wheel, the second blocking elements are arranged between the first blocking elements.

2. The mounting device for removably mounting an airbag module on a steering wheel according to claim 1, wherein the hooks are connected to the airbag module, the mounting device further comprising a mounting plate for mounting on the framework of the steering wheel, the mounting plate comprising a plurality of openings that form the insertion elements, each opening being suitable for receiving a hook, the first and second blocking elements of the resilient ring being formed on the mounting plate or the steering wheel.

3. The mounting device for removably mounting an airbag module on a steering wheel according to claim 1, wherein the guide elements comprise, close to the resilient ring, between the second portion and each first portion of the resilient ring a pivot stud that limits the movement of the resilient ring during the displacement of the second portion in order to bring about a rotation of the first portions out of the zone of interaction with the corresponding hook.

4. The mounting device for removably mounting an airbag module on a steering wheel according to claim 3, wherein the guide elements include two pivot studs that are symmetrical with respect to a plane containing the axis of rotation of the steering wheel.

5. The mounting device for removably mounting an airbag module on a steering wheel according to claim 3, wherein the guide elements comprise a guide stud of the resilient ring, close to the resilient ring, between the second portion and the pivot stud.

6. The mounting device for removably mounting an airbag module on a steering wheel according to claim 3, wherein the resilient ring comprises three folds between the second portion and the pivot stud.

7. The mounting device for removably mounting an airbag module on a steering wheel according to claim 3, wherein in the displacement direction of the second portion in a direction away from the axis of rotation of the steering wheel, the distance between the pivot studs and the second portion is between 30 and 70% of the distance between the second portion and the center of the interaction zone.

8. The mounting device for removably mounting an airbag module on a steering wheel according to claim 1, wherein the resilient ring is open, the first portions being located at the free ends of the resilient ring.

9. The mounting device for removably mounting an airbag module on a steering wheel according to claim 1, wherein the second portion of the resilient ring is positioned on the resilient ring so as to be at a substantially equal spacing from the first portions.

10. The mounting device for removably mounting an airbag module on a steering wheel according to claim 1, wherein the first and second blocking elements prevent movement of the resilient ring in a direction substantially perpendicular to the plane containing the resilient ring.

11. The mounting device for removably mounting an airbag module on a steering wheel according to claim 1, wherein the first and second blocking elements are formed by hooks.

12. The mounting device for removably mounting an airbag module on a steering wheel according to, wherein the second blocking elements are arranged in the region of the second portion.

13. The mounting device for removably mounting an airbag module on a steering wheel according to claim 5, further comprising two second hooks that are located between two guide studs.

14. A tool for dismantling the device for removably mounting an airbag module on a steering wheel according to claim 1, the tool comprises:
a gripping handle mounted in the axis of which is an end of a rod, the free end of the rod comprising a notch, the inside dimensions of which substantially correspond to the outside dimensions of the cross section of the second portion of the resilient ring, such that the rod is oriented in the direction away from the axis of rotation of the steering wheel when the notch is engaged on the second portion.

15. A dismantling tool for the mounting device of claim 1, in combination with a steering wheel having an airbag module and a dismantling tool, the dismantling tool including a gripping handle mounted in the axis of which is an end of a rod, the free end of the rod comprising a notch, the inside dimensions of which substantially correspond to the outside dimensions of the cross section of the second portion of the resilient ring, such that the rod is oriented in the direction away from the axis of rotation of the steering wheel when the notch is engaged on the second portion.

16. The mounting device for removably mounting an airbag module on a steering wheel according to claim 1, wherein the resilient ring is generally U-shaped with the first portions defining legs of the resilient ring and the second portion defining an intermediate portion extending between the legs.

* * * * *